United States Patent [19]
Rainey

[11] 4,433,449
[45] Feb. 28, 1984

[54] CHIMNEY CLEANER

[76] Inventor: Amon E. Rainey, 19765 SW. Hazelhurst, West Linn, Oreg. 97068

[21] Appl. No.: 408,530

[22] Filed: Aug. 16, 1982

[51] Int. Cl.$^3$ .............................................. F23J 3/00
[52] U.S. Cl. .................................... 15/243; 15/93 R; 15/104.1 R
[58] Field of Search ............... 15/93 R, 162, 163, 242, 15/243, 249, 104.1 R, 104.14, 104.3 SN, 236 R, 89, 92, 104.1 C, 246.5

[56] References Cited

U.S. PATENT DOCUMENTS

| | | | |
|---|---|---|---|
| 1,338,917 | 5/1920 | Hall | 15/162 |
| 2,026,680 | 1/1936 | Jacobson . | |
| 3,589,609 | 6/1971 | Wyant . | |
| 3,795,181 | 3/1974 | Lawson . | |
| 3,994,310 | 11/1976 | Brandon . | |

FOREIGN PATENT DOCUMENTS

| | | | |
|---|---|---|---|
| 2155733 | 5/1973 | Fed. Rep. of Germany | 15/243 |
| 95961 | 8/1922 | Switzerland | 15/243 |

Primary Examiner—Edward L. Roberts
Attorney, Agent, or Firm—Eugene M. Eckelman

[57] ABSTRACT

A flexible body member has lateral fingers arranged upon rotation to knock off substance which has collected on the inner surface of a chimney. A weight is provided at the bottom end of the body member to hold the latter substantially plumb in a chimney when operated, and a spindle is provided at the top of the body member for attachment to power drive mechanism such as a conventional hand drill. The body member preferably comprises a link chain having flattened lateral engaging portions which produce a drive connection from one link to the next without buckling or twisting. In a modified form of the invention, individual lateral fingers are pivotally connected to the body member and pivot upwardly by centrifugal force upon rotation of the body member whereby automatically to accommodate different chimney dimensions and offset portions thereof.

5 Claims, 4 Drawing Figures

CHIMNEY CLEANER

BACKGROUND OF THE INVENTION

This invention relates to new and useful improvements in chimney cleaners.

As is well known, substances such as soot and creosote build up on the inner surface of chimneys mostly due to incomplete combustion, and such substances must be removed periodically or else there is an extreme hazard of a chimney fire. It is thus customary to periodically remove such collected substances by brushes but such has the disadvantage that the collected creosote has hardened and cannot be wiped off by brushes. Cleaning structures have been provided which are operated rotatably, such as shown in U.S. Pat. No. 2,026,680. Structures of this type, however, are rather complex and bulky. Structures have also been provided for washing the inner surface of a chimney such as shown in U.S. Pat. No. 3,994,310. Such washing structures are messy in operation and require liquid pickup at the bottom and in addition require a rather high pressure for removing the collected substances.

SUMMARY OF THE INVENTION

According to the present invention and forming a primary objective thereof, a chimney cleaner is provided which is simplified in structure and effective in operation for removing collected substances from the inner surface of chimneys, including hardened substances such as creosote.

Another object of the invention is to provide a chimney cleaner that is power operated and more particularly to provide apparatus that can receive its power operation by detachable connection to a conventional electric hand drill.

Still another object is to provide a chimney cleaner which can expand in lateral dimension by centrifugal force acting on cleaning fingers thereof.

In carrying out the objectives of the invention, the chimney cleaner employs a flexible body member arranged to hang down in a chimney and support a weight on its bottom end that holds the body member substantially plumb in a chimney. The body member supports a plurality of fingers arranged upon rotation of the body member to knock off collected substance from the inner surface of the chimney. The top end of the body member has a spindle arranged for connection to a drive mechanism such as a conventional hand drill for rotating the body member.

Another object of the invention is to provide a chimney cleaner of the type described having cleaning arms that are capable of varying the reach thereof so as automatically to adjust to lateral chimney dimensions, including offset portions in the chimney.

DETAILED DESCRIPTION OF PREFERRED EMBODIMENTS

Figure 2:
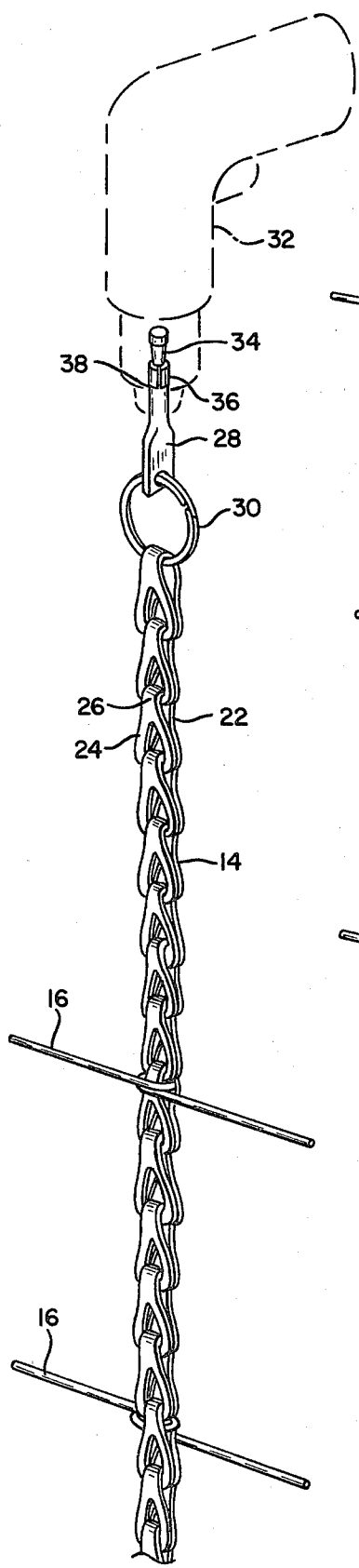
FIG. 2 is an elevational view of an upper portion of the cleaner, a conventional hand drill used for operating the cleaner being shown in broken lines.
Figure 3:
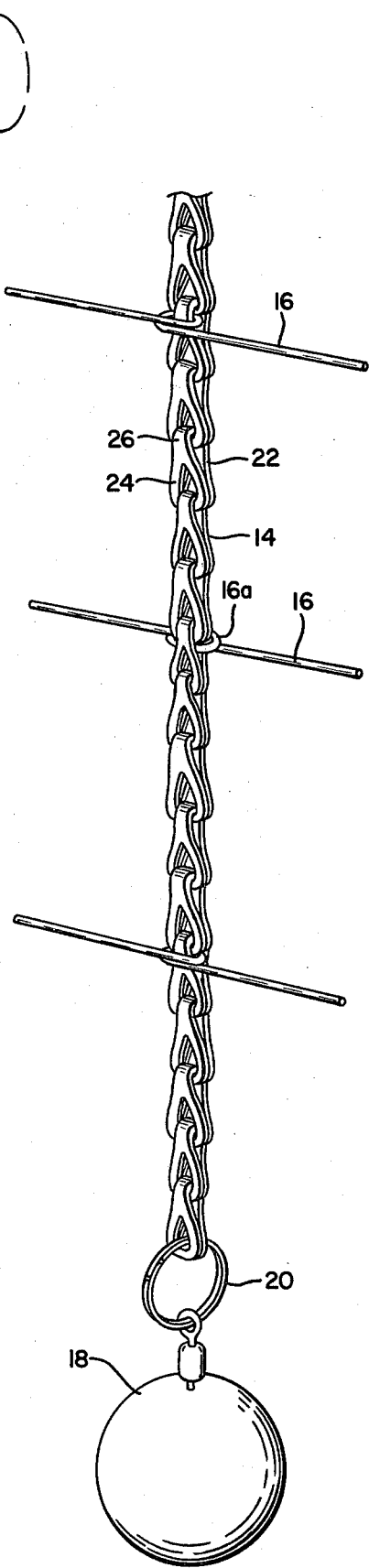
FIG. 3 is an elevational view of a lower portion of the cleaner.
Figure 1:
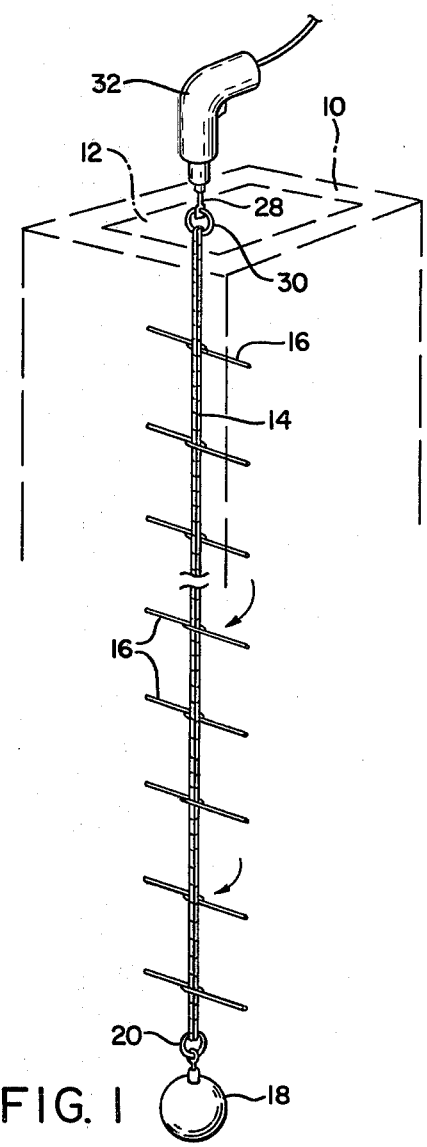
FIG. 1 is a foreshortened perspective view of the present chimney cleaner, a fragmentary portion of a chimney being cleaned shown in broken lines.

With particular reference to the drawings and first to FIGS. 1, 2 and 3, the numeral 10 designates a conventional chimney the inner surface 12 of which requires periodic cleaning of collected substances such as soot and creosote. According to the invention, a flexible body member 14 has cross fingers 16 secured thereto in longitudinal spaced relation. The bottom end of the body member is provided with a weight 18 such as a lead ball by means of a connecting ring 20. Upon hanging the body member 14 internally of a chimney, it will be held plumb in the chimney by the weight 18 and upon operation thereof, the fingers 16 knock off the collected substance from the inner surface.

As a feature of the invention, the flexible body member 14 comprises a chain of the type having links 22 with a flattened apertured end 24 which forms an eye for connection to an adjacent link. These links also have an apertured end 26 forming an eye extending in the opposite direction to the first eye and arranged for connection to an opposite adjacent link. The connecting portions of adjacent links, comprising the ends 24 and 26 have a substantially straight lateral dimension in their connection whereby the chain will resist torsion and thus rotate as an integral unit without twisting or buckling. The cross fingers are readily connected to the body member by loops 16a in the fingers engaged with eyes of the chain. Preferably, adjacent loops 16a are formed on opposite sides of the body member for balance of operation.

As another feature of the present cleaner, the top end of the body member has a spindle 28 secured thereto by a connecting ring 30. Spindle 28 is of a structure arranged for detachable connection to the chuck of a conventional hand drill 32. This spindle has a special construction which positively holds it in a drill motor chuck. For this purpose, it has an outwardly tapering end 34 and an enlarged split sleeve 36 that is slidable on the spindle and limited in downward movement by a shoulder 38. When installed in the drill the sleeve is gripped by the chuck, and as the spindle is pulled down by the hanging chain 14 and weight 18, the tapered end 34 expands the sleeve to positively grip the drill chuck.

To clean a chimney, it is merely necessary for the workman to suspend the body member in the chimney and provide rotation of such body member by a hand drill. As the chimney cleaner is rotated, it is simultaneously reciprocated up and down through a short distance in order that the entire inner surface of the chimney will be engaged by the fingers 16. The fingers, being of stiff wire or the like, have sufficient impact strength on the collected substance to readily remove hardened substance such as creosote.

Figure 4:
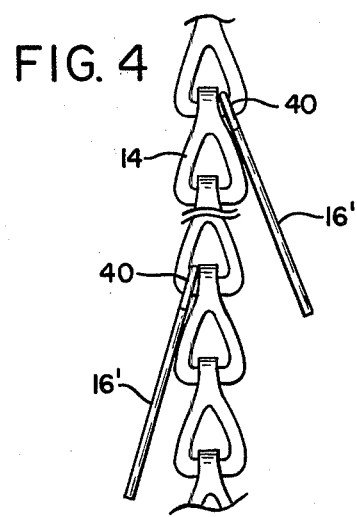
FIG. 4 is a foreshortened elevational view of a modified form of the invention.

With particular reference to FIG. 4 a modified structure is shown which employs a body portion 14 identical to that of FIGS. 1-3, as well as an identical weight 18 and chuck 28. In this structure, however, the surface engaging fingers 16' are individually mounted on links of the chain by eyes 40 formed on the inner ends of the fingers. More particularly, individual fingers are provided for each side of the body member with the eyes 40 being of sufficient size to allow the fingers to pivot vertically. The fingers will thus hang down by gravity but when the body member is rotated, they swing out against the inner surface of the chimney to accomplish the cleaning function. Pairs of these fingers may be mounted on the same chain link as in the FIG. 1 embodiment but can also be staggered as shown in FIG. 4.

An advantage of the FIG. 4 finger arrangement is that if the chimney has areas of different diameter, and such is often the case adjacent the lower end, the fingers will automatically swing out to accommodate these offset chimney areas. The FIG. 4 arrangement will also accommodate different chimney sizes.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A chimney cleaner comprising
   (a) a link chain having top and bottom ends and arranged to hang down in a chimney,
   (b) the adjacent links of said chain having flattened lateral engaging portions whereby to produce a rotative drive connection from one link to the next,
   (c) lateral fingers secured on said link chain arranged upon rotation of said link chain to knock off substance which has collected on the inner surface of the chimney,
   (d) each of said lateral fingers comprising a stiff piece of wire connected to spaced links of said chain and extending laterally in opposite directions,
   (e) a weight on the bottom end of said link chain arranged to hold the latter substantially plumb in a chimney,
   (f) and a spindle on the top end of said link chain arranged for connection to a drive mechanism for rotating said link chain and lateral fingers.

2. The chimney cleaner of claim 1 wherein said spindle is designed for removable connection to the chuck of a conventional hand drill.

3. The chimney cleaner of claim 2 wherein said spindle includes a tapered end and a split sleeve arranged under the weight of said link chain and bottom weight to expand in the hand drill chuck.

4. The chimney cleaner of claim 1 wherein said lateral fingers are looped around the links of the chain for securement thereto, the loops for said fingers being alternated on opposite sides of said flexible link chain for balance.

5. A chimney cleaner comprising
   (a) a link chain having top and bottom ends and arranged to hang down in a chimney,
   (b) the adjacent links of said chain having flattened lateral engaging portions whereby to produce a rotative drive connection from one link to the next,
   (c) lateral fingers secured on said link chain arranged upon rotation of said link chain to knock off substance which has collected on the inner surface of the chimney,
   (d) each of said lateral fingers having a pivot connection to said link chain and being pivoted out to a chimney cleaning position by centrifugal force,
   (e) a weight on the bottom end of said link chain arranged to hold the latter substantially plumb in a chimney,
   (f) and a spindle on the top end of said link chain arranged for connection to a drive mechanism for rotating said link chain and lateral fingers.

* * * * *